United States Patent [19]

Bryan et al.

[11] Patent Number: 4,988,881

[45] Date of Patent: Jan. 29, 1991

[54] TIN-ACTIVATED LITHIUM HAFNATE PHOSPHOR COMPOSITION AND X-RAY INTENSIFYING SCREEN

[75] Inventors: Philip S. Bryan, Webster; Patrick M. Lambert, Rochester; Christine M. Towers, Rochester; Gregory S. Jarrold, Rochester, all of N.Y.

[73] Assignee: Eastman Kodak Company, Rochester, N.Y.

[21] Appl. No.: 393,602

[22] Filed: Aug. 14, 1989

Related U.S. Application Data

[63] Continuation-in-part of Ser. No. 305,310, Feb. 3, 1989, abandoned.

[51] Int. Cl.$^5$ .............................................. C09K 11/67
[52] U.S. Cl. ........................... 250/483.1; 252/301.4 F; 428/690
[58] Field of Search .............. 252/301.4 F; 250/483.1; 428/690

[56] References Cited

U.S. PATENT DOCUMENTS

| | | | |
|---|---|---|---|
| 2,542,336 | 3/1951 | Kroger | 252/301.4 |
| 4,006,097 | 2/1977 | Kelsey | 252/301.4 |
| 4,068,128 | 1/1978 | Chenot et al. | 428/539 |
| 4,112,194 | 9/1978 | Chenot | 428/539 |
| 4,496,844 | 1/1985 | Ackerman | 250/483.1 |

OTHER PUBLICATIONS

Grizik et al, "Russian Journal of Inorganic Chemistry", vol. 6, No. 10 (1961).

Plyvshchev et al, "Russian Journal of Inorganic Chemistry", vol. 17, No. 9 (1962).

D. K. Smith & H. W. Newkirk, "The Crystal Structure of Baddeleyite (Monoclinic $ZrO_2$) and Its Relation to the Polymorphism of $ZrO_2$", *Acta Cryst.*, 18, 1965, pp. 983–991.

J. L. Hodeau, M. Marezio, A. Santoro, & R. S. Roth, *J. Solid State Chem.*, 45, 170 (1982).

N. V. Porotnikov, V. V. Ganin, N. M. Gerardi, L. V. Golubeva, & K. I. Petrove., *J. Russ. Inorg. Chem.*, 32, 764 (1987).

Bryan et al U.S. Ser. No. 305,222, filed Feb. 3, 1989, Titled X-Ray Intensifying Screen, Phosphor Composition, and Process of Phosphor Preparation.

L. H. Brixner, "Structural and Luminescent Properties of the $Ln_2Hf_2O_7$-Type Rare Earth Hafnates", Mat. Res. Bull., vol. 19, pp. 143–149, 1984.

R. Scholder, D. Rade, & H. Schwarz, *Z. Anorg. Allg. Chem.*, 362, 149 (1968).

G. Dittrich & R. Hoppe, *Z. Anorg. Allg. Chem.*, 371, 306 (1969).

*Primary Examiner*—Jack Cooper
*Attorney, Agent, or Firm*—Carl O. Thomas

[57] ABSTRACT

A phosphor composition is disclosed comprised of phosphor crystals which consist essentially of oxygen and a combination of metals satisfying the relationship:

$$Li_2Hf_{1-x-y-z}Zr_zSn_yTi_xL_w$$

where
L is at least one rare earth;
w+x+y collectively are 0 to 0.2; and
z is up to 0.2.

The composition has utility in an intensifying screen for producing a latent image in a silver halide radiographic element when imagewise exposed to X-radiation.

27 Claims, 5 Drawing Sheets

TIN-ACTIVATED LITHIUM HAFNATE PHOSPHOR COMPOSITION AND X-RAY INTENSIFYING SCREEN

Field of the Invention

The invention relates to novel X-ray intensifying screens which upon exposure to an imagewise pattern of X-radiation are capable of emitting a corresponding pattern of longer wavelength electromagnetic radiation. The invention additionally relates to novel phosphor compositions.

BACKGROUND OF THE INVENTION

A developable latent image is formed in a silver halide emulsion layer of a radiographic element when it is imagewise exposed to X-radiation. Silver halide emulsions, however, more efficiently absorb and consequently are more responsive to longer (300 to 1500 nm) wavelength electromagnetic radiation than to X-radiation. Silver halide possesses native sensitivity to both the near ultraviolet and blue regions of the spectrum and can be sensitized readily to the green, red, and infrared portions of the electromagnetic spectrum.

Consequently it is an accepted practice to employ intensifying screens in combination with silver halide emulsion layers. An intensifying screen contains on a support a fluorescent phosphor layer that absorbs the X-radiation more efficiently than silver halide and emits to the adjacent silver halide emulsion layer longer wavelength electromagnetic radiation in an image pattern corresponding to that of the X-radiation received.

While the phosphor layer and emulsion layer can be integrated into one element, in most instances the adjacent silver halide emulsion layer is coated on a separate support to form a separate radiographic element. In this way, the intensifying screen, which is not permanently altered by exposure, can be reused. The most common arrangement for X-radiation exposure is to employ a dual coated radiographic element (an element with silver halide emulsion layers on opposite sides of a support), each emulsion layer being mounted adjacent a separate intensifying screen.

Phosphors employed in intensifying screens consist of particulate crystalline phosphors, typically oxides of a combination of metals. Often an oxide of one or two of the metals forms what is referred to as the phosphor host while oxides of one or more metals, often referred to as activators, are incorporated in the host in relatively low concentrations to change the hue and/or improve the efficiency of fluorescence. Lanthanides have been frequently employed as activators.

It has been recognized that the phosphors of highest absorption efficiencies are those in which the host compound contains at least one element from Period 6 of the Periodic Table of Elements. For example, barium sulfate, lanthanide oxyhalides and oxysulfides, yttrium tantalate, and calcium tungstate, are widely employed phosphor host compounds.

One family of phosphor host compounds that have shown promise in terms of performance, but have been little used are rare earth hafnates. L. H. Brixner, "Structural and Luminescent Properties of the Ln$_2$Hf$_2$O$_7$-type Rare Earth Hafnates", Mat. Res. Bull., Vol. 19, pp. 143–149, 1984, describes investigations of such phosphor host compounds. Ln is defined to include not only lanthanides, but also scandium and yttrium.

Another hafnium containing phosphor host compound that has been recognized to possess high efficiency in its absorption of X-radiation, but has enjoyed no practical use is optical grade hafnia—that is, hafnia that contains less than $3 \times 10^{-4}$ mole zirconia. Kelsey U.S. Pat. No. 4,006,097, issued May 5, 1975, discloses to be useful in the absorption of X-radiation a phosphor satisfying the formula:

$HfO_2$:Yb with Yb being present in a concentration of $5 \times 10^{-3}$ to $1 \times 10^{-1}$. Brixner, cited above, also investigated optical grade hafnia.

Lithium hafnate is a known compound. The following report investigations of lithium hafnate, but report no observations of luminescence:

R. Scholder, D. Rade, and H. Schwarz, Z. Anorg. Allg. Chem., 362, 149 (1968);

G. Dittrich and R. Hoppe, Z. Anorg. Allg. Chem., 371, 306 (1969);

J. L. Hodeau, M. Marezio, A. Santoro, and R. S. Roth, J. Solid State Chem., 45, 170 (1982); and N. V. Porotnikov, V. V. Ganin, N. M. Gerardi, L. V. Golubeva, and K. I. Petrove., J. Russ. Inorg. Chem., 32, 764 (1987).

Chenot et al U.S. Pat. Nos. 4,068,128 and 4,112,194 disclose a variety of phosphors formed of varied ratios of phosphorus, hafnium, oxygen, and, optionally, zirconium. The various phosphor hosts produced by phosphorus in combination with hafnium are, of course, crystallographically dissimilar from hafnia host phosphors and offer no reliable indication of the effect of zirconium on the luminescence of monoclinic hafnia crystals.

Kroger et al U.S. Pat. No. 2,542,336 discloses a phosphor containing titanium as an activator and having a matrix composed of one or more of the oxides of zirconium, hafnium, thorium, germanium, or tin, to which may be added either acid or basic oxides or both. Suitable basic oxides are the oxides of sodium, potassium, rubidium, cesium, lithium, barium, calcium, strontium, magnesium, beryllium, and zinc. The acid oxides are those of the group $SO_3$, $B_2O_3$, $P_2O_3$, and $SiO_2$.

RELATED PATENT APPLICATION

Bryan et al U.S. Ser. No. 305,222, filed Feb. 3, 1989, commonly assigned, titled X-RAY INTENSIFYING SCREEN, PHOSPHOR COMPOSITION, AND PROCESS OF PHOSPHOR PREPARATION, discloses the preparation of hafnia phosphors containing higher levels of zirconium than are present in optical grade hafnia. In one of the varied forms of preparing the hafnia phosphor lithium hafnate is formed as a second phase.

SUMMARY OF THE INVENTION

In one aspect this invention is directed to an intensifying screen comprised of a support and a fluorescent layer containing phosphor crystals capable of absorbing X-radiation and emitting longer wavelength electromagnetic radiation. The screen is characterized in that the phosphor crystals consist essentially of oxygen and a combination of metals satisfying the relationship:

$Li_2Hf_{1-x-y-z}Zr_xSn_yTi_xL_w$ where

L is at least one rare earth;
w+y+z are collectively 0 to 0.2; and
z is up to 0.2.

In another aspect this invention is directed to a composition comprised of phosphor crystals consisting essentially of oxygen and a combination of metals satisfying the relationship:

$$Li_2Hf_{1-x-y-z}Zr_zSn_yTi_xL_w$$

where
L is at least one rare earth;
w+x+y are together 0 to 0.2;
z is up to 0.2; and
at least one of L, Sn, and Ti is present in an emission modifying amount.

DESCRIPTION OF PREFERRED EMBODIMENTS

An essential and novel feature of the intensifying screens of this invention is a crystalline phosphor that absorbs X-radiation and emits longer wavelength electromagnetic radiation. The phosphor crystals consist essentially of oxygen and a combination of metals satisfying the relationship:

$$Li_2Hf_{1-x-y-z}Zr_zSn_yTi_xL_w \qquad (I)$$

where
L is at least one rare earth;
w+x+y are collectively 0 to 0.2; and
z is up to 0.2.

When at least one of L, Sn, and Ti are present in an emission modifying amount, the phosphor crystals are of a novel composition. Each of the minimum preferred concentrations of L, Sn, and Ti set forth below are sufficient to modify phosphor emission.

In the simplest form of the phosphor crystals no rare earth activator is present—i.e., w is zero; neither titanium nor tin are present—i.e., x and y are each zero; and zirconium is present at only impurity levels. Because of the similarities of the chemical properties of hafnium and zirconium it is impossible to separate completely the two elements. Optical grade hafnium compounds, the purest form of hafnium commercially available, contain about $2.75 \times 10^{-4}$ mole of zirconium per mole of hafnium. Reagent grade hafnium compounds, commercially available at considerably lower cost, are typically specified to contain about $1 \times 10^{-2}$ mole of zirconium per mole of hafnium.

By blending zirconium compounds with hafnium compounds during formation of the phosphor it is possible to increase the zirconium concentration to any desired level. Thus, in one form, the phosphor crystals satisfying the requirements of the invention consist essentially of oxygen and a combination of lithium, hafnium, and zirconium satisfying the relationship:

$$Li_2Hf_{1-z}Zr_z \qquad (II)$$

where z ranges from the lowest attainable levels, typically $2.75 \times 10^{-4}$, to 0.20, preferably up to 0.15, and optimally up to 0.02.

It is possible to replace hafnium compounds containing only impurity levels of zirconium with zirconium compounds containing only impurity levels of hafnium. However, since hafnium is a Period 6 element while zirconium is a Period 5 element, it is not unexpected that X-ray excited luminescence of the phosphors decline with progressively larger proportions of zirconium. The optimum proportions of hafnium and zirconium in the phosphor for most applications represent a balance between performance and cost considerations. For intensifying screens intended for use in medical radiography, which places a premium on performance, phosphors prepared from reagent grade hafnium sources or, in extremely demanding applications, optical grade hafnium sources, without intentionally adding zirconium from any other source, are generally preferred.

One performance advantage that can be derived from the inclusion of higher levels of zirconium is adjustment of the wavelength of peak phosphor emission. Zirconium can, as a function of its concentration, permit fine tuning of the peak emission wavelength of the phosphor. Fine tuning to match the peak emission wavelength of the phosphor to the peak absorption wavelength of the silver halide emulsion layer of the radiographic element to be exposed can have a significant impact on the efficiency of the overall imaging system. By selection, specific zirconium concentrations can be chosen to produce phosphor peak emission wavelengths that match dye absorption peaks in silver halide emulsion layers of radiographic elements. Fine tuning of the peak emission wavelength of the phosphor when either or both of tin and titanium are also present in the phosphor crystals is specifically contemplated.

It has been discovered that the performance of the phosphors can be enhanced by substituting at least one of titanium and tin for a minor portion of the hafnium.

In one preferred form of the invention titanium is incorporated in the phosphor crystals as an activator. Thus, in one preferred form of the phosphor, it consists essentially of oxygen and a combination of lithium, hafnium, zirconium, and titanium satisfying the relationship $$Li_2Hf_{1-x-z}Zr_zTi_x \qquad (III)$$

where
x is the range of from $3 \times 10^{-4}$ to 0.2, preferably $1 \times 10^{-3}$ to $5 \times 10^{-2}$ and
z is as previously described.

The titanium activator shifts the wavelength of peak luminescence to the longer blue (420 to 500 nm) portion of the spectrum. Blue emitting phosphors are particularly advantageous for intensifying screens intended to be employed in combination with radiographic elements containing silver halide emulsions that either possess high native sensitivity to the blue portion of the spectrum or have been spectrally sensitized with a blue absorbing dye. Another advantage of blue emission is that the organic vehicles of emulsion layers are typically transparent in the blue portion of the spectrum.

In another preferred form of the invention tin is incorporated in the phosphor crystals as an activator. In a specifically preferred form the phosphor consists essentially of oxygen and lithium, hafnium, zirconium, and tin satisfying the relationship:

$$Li_2Hf_{1-y-z}Zr_zSn_y \qquad (IV)$$

where y is the range of from $1 \times 10^{-3}$ to 0.2, preferably $5 \times 10^{-3}$ to 0.1, and z is as previously described.

Tin increases phosphor luminescence and also shifts the wavelength of peak luminescence to wavelengths near 400 nm. The shorter wavelength blue emission of the tin activated phosphor is advantageous, since native blue sensitivity of silver halide emulsions is much higher nearer 400 than at 450 nm and longer wavelengths.

Rare earth activators for the phosphors of this invention are also contemplated. As employed herein the term "rare earth" includes the lanthanides (elements 57 to 71), yttrium, and scandium—i.e. the Group 3 elements other than the actinides (elements 89+). The following rare earths are preferred for use as activators: praseodymium (e.g., $Pr^{+3}$), samarium (e.g., $Sm^{+3}$), europium (e.g., $Eu^{+3}$), gadolinium (e.g., $Gd^{+3}$), terbium (e.g., $Tb^{+3}$), dysprosium (e.g., $Dy^{+3}$), and ytterbium (e.g., $Yb^{+3}$).

When a rare earth activator is incorporated in the phosphor crystals, they consist essentially of oxygen and a combination of metals satisfying the relationship:

$$Li_2DL_w \qquad (V)$$

where

D is any combination of hafnium, zirconium, titanium, and tin described above;

L is at least one rare earth; and w is 0 to 0.2, preferably $1 \times 10^{-4}$ to 0.1, and optimally from about $1 \times 10^{-3}$ to $5 \times 10^{-2}$.

It is specifically contemplated to employ tin to increase the total luminescence of the phosphor and to incorporate one or a combination of rare earths to shift the wavelengths of emission to specifically desired bands. The rare earth activators have the additional advantage of producing relatively narrow band emissions as compared to the broad band emissions produced by titanium and tin.

Specifically preferred rare earth activated phosphor crystals consist essentially of oxygen and a combination of metals satisfying the following relationship:

$$Li_2Hf_{1-z}Zr_zL_w \qquad (VI)$$

wherein L, w, and z are as previously defined.

To form the crystalline phosphor, starting materials are blended to provide a ratio of lithium, hafnium, zirconium, and the optional activators satisfying the relationship:

$$Li_mHf_{1-x-y-z}Zr_zSn_yTi_xL_w \qquad (VII)$$

where m is at least 2;

y' represents n(y);

n is 1 to 2; and

L, w, x, and z are as previously defined.

The same proportions of hafnium, zirconium, titanium, and rare earths incorporated as starting materials appear in the final phosphors. In other words, no significant losses are observed during phosphor manufacture. Measurements suggest that there is a minor loss of tin during preparations involving a washing step and/or an excess of lithium ion, with no loss of tin during preparation being observed in other preparations. There is no theoretical limit on the stoichiometric excess of lithium that can be initially present, since excess lithium can be washed from the phosphor at intermediate preparation stages or even after the phosphor is fully formed. Thus, m can conveniently range as high as 10. It is preferred that m be selected in the range of from about 2 to 6.

The preferred lithium starting material is lithium carbonate. However, other lithium starting materials, such as lithium hydroxide, lithium nitrate, and any lithium organic compound corresponding to the zirconium and hafnium organic compounds more specifically described below can be employed. Lithium carboxylates, such as lithium oxalate, lithium acid oxalate, and lithium acetate, are specifically preferred lithium organic compound selections.

In preparing the simplest form of the phosphors in which only lithium, hafnium, and zirconium are present, commercially available sources of lithium, zirconium, and hafnium are intimately intermixed as solids or by being dissolved in a common solvent followed by coprecipitation. The starting materials are chosen so that upon firing only lithium, hafnium, zirconium, and oxygen atoms remain as residue, any other moieties of the compounds being thermally decomposed or otherwise driven off in firing.

Common sources of hafnium and zirconium include the dioxides, the basic carbonates, the oxychlorides, the oxynitrates, and the tetrachlorides. While the dioxides and the basic carbonates can be used as purchased to produce phosphors, it is advantageous for both handling and phosphor performance to convert the other sources to less soluble solids that can be fired to give the phosphor desired. For example, treatment of aqueous hafnium and zirconium ion containing solutions with base (e.g., alkali or ammonium hydroxide) gives a precipitate which is a mixture of hydrous hafnia and hydrous zirconia, the relative proportions of which depend upon those present in the starting materials.

Other useful solids can be produced by treating hafnium and zirconium ion containing solutions with organic precipitating agents, since organic materials consisting of carbon, hydrogen, and optionally nitrogen and/or oxygen leave no objectionable residue upon thermal decomposition.

Hafnium and zirconium can be conveniently coprecipitated as carboxylates, such as those derived from carboxylic acids containing from about 2 to 20 carbon atoms. The carboxylate moieties are in one preferred form aliphatic carboxylates containing from about 2 to 10 carbon atoms, including both monocarboxylates and polycarboxylates—particularly dicarboxylates, such as oxalates, succinates, fumarates, etc. Aromatic carboxylates, such as benzoates, phthalates, and their ring substituted homologues, are also convenient to use. A particularly preferred class of carboxylates are α-hydroxycarboxylates containing from 2 to 10 carbon atoms, such as glycolates, lactates, and mandelates. Oxalic acid can be viewed as either a dicarboxylic acid or an α-hydroxycarboxylic acid. Oxalates are particularly preferred moieties for forming not only hafnium and zirconium compounds, but also compounds of other metals to be incorporated in forming preferred forms of the phosphor more particularly described below. The carboxylate moieties can form simple carboxylates with the hafnium or zironium or can form hafnium or zirconium carboxylate complexes including additional cations, such as alkali metal or ammonium ions.

The hafnium and zirconium carboxylates can be conveniently formed by reacting in a common solvent the acid, salt, or ester of the carboxylate with hafnium and zirconium containing compounds in the ratios desired in the phosphor. The hafnium and zirconium containing compounds to be reacted can be selected from among compounds such as hafnium tetrachloride, zirconium tetrachloride, hafnium oxychloride, zirconium oxychloride, hafnium basic carbonate, zirconium basic carbonate, hafnium nitrate, zirconium nitrate, zirconium carbonate, hafnium sulfate, zirconium sulfate, and mixtures thereof.

It is also contemplated to employ hafnium and zirconium alkoxides as starting materials. Preferred hafnium and zirconium alkoxides are which satisfy formula VIII:

$$D'(OR)_4 \qquad (VIII)$$

where
D' represents zirconium or hafnium and
R represents a hydrocarbon moiety containing from about 1 to 20 (preferably about 1 to 10) carbon atoms. The hydrocarbon moieties can be chosen from any convenient straight or branched chain or cyclic saturated or unsaturated aliphatic hydrocarbon moiety—e.g., alkyl, cycloalkyl, alkenyl, or alkynyl. Alternatively the hydrocarbon moiety can be an aromatic moiety—e.g., benzyl, phenyl, tolyl, xylyl, naphthyl, etc. In a specifically preferred from R is in each instance lower alkyl of from 1 to 4 carbon atoms. Hafnium and zirconium alkoxides are disclosed in U.S. Pat. Nos. 3,297,414; 3,754,011; 4,525,468; and 4,670,472, the disclosures of which are here incorporated by reference.

In addition to alkoxide and carboxylate moiety containing hafnium and zirconium compounds various chelates, such as hafnium and zirconium $\beta$-diketones and diaminecarboxylates can be employed. Exemplary useful hafnium starting materials are set forth in Table IX below. All the compounds have otherwise identical zirconium analogues. Further, although water of hydration has been omitted, it is to be understood that under normal ambient conditions most of the compounds exist as hydrates.

TABLE IX

| | | |
|---|---|---|
| H-1 | Hafnyl oxalate | $HfO(C_2O_4)$ |
| H-2 | Hafnyl oxalic acid | $H_2[HfO(C_2O_4)_2]$ |
| H-3 | Dioxalatohafnium | $Hf(C_2O_4)_2$ |
| H-4 | Trioxalatohafnic acid | $H_2[Hf(C_2O_4)_3]$ |
| H-5 | Ammonium trioxalatohafnate | $(NH_4)_2[Hf(C_2O_4)_3]$ |
| H-6 | Lithium tetraoxalatohafnate | $Li_4[Hf(C_2O_4)_4]$ |
| H-7 | Ammonium hafnyl oxalate | $(NH_4)_2[HfO(C_2O_4)_2]$ |
| H-8 | Polyoxalatopolyhafnic acids | |
| H-9 | Lithium hafnyl tartrate | $Li_2[HfO(C_4H_4O_6)_2]$ |
| H-10 | Tetramandelatohafnic acid | $H_4[Hf(O_2CCHOC_6H_5)_4]$ |
| H-11 | Triglycolatohafnic acid | $H_3HfOH(OCH_2COO)_3$ |
| H-12 | Trilactohafnic acid | $H_3HfOH(OCHCH_3COO)_3$ |
| H-13 | Trioxodihafnium stearate | $Hf_2O_3(_2C(CH_2)_{16}CH_3)_2$ |

TABLE IX-continued

| | | |
|---|---|---|
| H-14 | Trioxodihafnium 2-ethylcaproate | $Hf_2O_3(O_2CCHC_2H_5(CH_2)_3CH_3)_2$ |
| H-15 | Hafnium acetylacetonate | $Hf(C_5H_7O_2)_4$ |
| H-16 | Lithium bisnitrilotriacetohafnate | $Li_2\{Hf[N(CH_2CO_2)_3]\}$ |
| H-17 | Hafnium ethylenediaminetetraacetic acid | $Hf[(O_2CCH_2)_2NCH_2]_2$ |
| H-18 | Hafnyl malonate | $HfO(O_2CCH_2CO_2)$ |
| H-19 | Hafnyl phthalate | $HfO(O_2C_6H_4CO_2)$ |
| H-20 | Hafnium tetraisopropoxide | $Hf(OC_3H_7)_4$ |
| H-21 | Hafnium tetra-t-amyloxide | $Hf(OC_5H_{11})_4$ |
| H-22 | Hafnium tetra(phenoxide) | $Hf(OC_6H_5)_4$ |
| H-23 | Hafnium di(isopropoxide) bis(2-ethoxyethoxide) | $Hf(OC_3H_7)_2(OC_2H_4OC_2H_5)_2$ |
| H-24 | Hafnium tetra(cyclohexoxide) | $Hf(OC_6H_{11})_4$ |
| H-25 | Hafnium di(isopropoxide) bis[2-(2-n-dodecanoxyethoxy)ethoxide] | $Hf(OC_3H_7)_2(OC_2H_4OC_2H_4OC_{12}H_{25})_2$ |

Formation of the phosphor is achieved by heating the zirconium and hafnium compounds to temperatures up to and including 1400° C. Higher firing temperatures can, of course, be undertaken; however, it is a distinct advantage of this invention that firing temperatures above 1400° C. are not required. Preferred firing temperatures are in the range of from about 900° to 1300° C.

Firing is continued until the phosphor reaches a form that is substantially thermally invariant. For maximum firing temperatures the duration of firing can be less than 1 hour. While extended firing times are possible, once the phosphor has reached a thermally invariant form, extending the duration of firing serves no useful purpose. Generally firing times in the range of from 1 to 10 hours, more typically 2 to 5 hours, provide full conversions of the starting materials to the phosphor composition sought.

Since the starting materials are in most instances decomposed at temperatures well below the 900° C. minimum temperature level contemplated for monoclinic crystal growth, it is generally convenient to heat the starting materials to a temperature above their decomposition temperature, but below 900° C., for an initial period to purge volatilizable materials before progressing to the higher crystallization temperatures. Typically, a preliminary heating step in the range of from about 300° to 900° C., preferably in the range of from 400° to 700° C., is undertaken.

It is also often convenient to divide firing into two or more consecutive steps with intermediate cooling to permit grinding and/or washing the material. Intermediate grinding can facilitate uniformity while intermediate washing, typically with distilled water, reduces the risk of unwanted contaminants, such as starting material decomposition by-products. Intermediate washing is preferred to reduce stoichiometric excesses of lithium, thereby avoiding the risk of corroding furnace elements by the release lithium oxide and avoiding the formation of unwanted secondary phases.

Any of the titanium, tin, and rare earth activators described above can be introduced into the phosphor by blending a compound of one of these elements with the lithium, hafnium, and zirconium starting materials. Generally any titanium, tin, or rare earth compound which is thermally decomposed to leave a residue consisting of only the desired activator metal and oxygen can be employed as a starting material. It is possible to introduce the activator as an oxide and to mix physically the activator oxide with the lithium, hafnium, and zirconium starting materials. For example, the use of tin oxide and titania as starting materials are contemplated. Preferred activator starting materials are carboxylates and alkoxides of the type described above.

The crystalline phosphors, once formed to satisfy the composition requirements of this invention, can be employed to form an intensifying screen of any otherwise conventional type. In its preferred construction the intensifying screen is comprised of a support onto which is coated a fluorescent layer containing the crystalline phosphor in particulate form and a binder for the phosphor particles. The phosphors can be used in the fluorescent layer in any conventional particle size range and distribution. It is generally appreciated that sharper images are realized with smaller mean particle sizes. Preferred mean particle sizes for the phosphors of this invention are in the range of from 0.5 $\mu$m to 40 $\mu$m, optimally from 1.0 $\mu$m to 20 $\mu$m.

It is, of course, recognized that the phosphor particles can be blended with other, conventional phosphor particles, if desired, to form an intensifying screen having optimum properties for a specific application. Intensifying screen constructions containing more than one phosphor containing layer are also possible, with a crystalline phosphor of the type described above being present in one or more of the phosphor containing layers.

The fluorescent layer contains sufficient binder to impart structural coherence. The binders employed in the fluorescent layers can be identical to those conventionally employed in fluorescent screens. Such binders are generally chosen from organic polymers which are transparent to X-radiation and emitted radiation, such as sodium o-sulfobenzaldehyde acetal of poly(vinyl alcohol); chlorosulfonated poly(ethylene); a mixture of macromolecular bisphenol poly(carbonates) and co-polymers comprising bisphenol carbonates and poly-(alkylene oxides); aqueous ethanol soluble nylons; poly-(alkyl acrylates and methacrylates) and copolymers of alkyl acrylates and methacrylates with acrylic and methacrylic acid; poly(vinyl butyral); and poly(urethane) elastomers. These and other useful binders are disclosed in U.S. Pat. Nos. 2,502,529; 2,887,379; 3,617,285; 3,300,310; 3,300,311; and 3,743,833; and in *Research Disclosure*, Vol. 154, Feb. 1977, Item 15444, and Vol. 182, June 1979. Particularly preferred intensifying screen binders are poly(urethanes), such as those commercially available under the trademark Estane from Goodrich Chemical Co., the trademark Permuthane from the Permuthane Division of ICI, Ltd., and the trademark Cargill from Cargill, Inc.

The support onto which the fluorescent layer is coated can be of any conventional type. Most commonly, the support is a film support. For highest levels of image sharpness the support is typically chosen to be black or transparent and mounted in a cassette for exposure with a black backing. For the highest attainable speeds a white support, such as a titania or barium sulfate loaded or coated support is employed. Specifically preferred reflective supports offering the highest attainable balance of speed and sharpness are those containing reflective microlenslets, disclosed by Roberts et al U.S. Ser. No. 243,374, filed Sept. 12, 1988, titled AN X-RAY INTENSIFYING SCREEN PERMITTING AN IMPROVED RELATIONSHIP OF IMAGING SPEED AND SHARPNESS, commonly assigned now U.S. Pat. No. 4,912,333.

Any one or combination of conventional intensifying screen features, such as overcoats, subbing layers, and the like, compatible with the features described above can, of course, be employed. Both conventional radiographic element and intensifying screen constructions are disclosed in *Research Disclosure*, Vol. 184, Aug. 1979, Item 18431, the disclosure of which and the patents cited therein are here incorporated by reference. *Research Disclosure* is published by Kenneth Mason Publications, Ltd., Emsworth, Hampshire P010 7DD, England.

In one specifically preferred form of the invention, illustrating intensifying screens satisfying the requirements of the invention intended to be employed with a separate silver halide emulsion layer containing radiographic element, the lithium containing phosphor of this invention can be substituted for any of the conventional phosphors employed in either the front or back intensifying screens of Luckey, Roth et al U.S. Pat. No. 4,710,637, the disclosure of which is here incorporated by reference. Similar modification of any of the conventional intensifying screens disclosed in the following patents is also contemplated: DeBoer et al U.S. Pat. No. 4,637,898; Luckey, Cleare et al U.S. Pat. No. 4,259,588; and Luckey U.S. Pat. No. 4,032,471.

While the phosphors can be employed for their prompt emission following exposure to X-radiation, they can also be employed as storage phosphors—that is, for their ability to emit electromagnetic radiation in a chosen wavelength range after being exposed to X-radiation and then stimulated by exposure to radiation in a third spectral region. For example, the phosphors of this invention can be employed in imaging systems of the type disclosed by Luckey U.S. Pat. No. 3,859,527, the disclosure of which is here incorporated by reference. When employed in such a system the refractive indices of the phosphor and binder are preferably approximately matched, as disclosed by DeBoer et al U.S. Pat. No. 4,637,898, also incorporated by reference.

EXAMPLES

The invention can be better appreciated by reference to the following specific examples.

EXAMPLE 1

$Li_2Hf_{1-z}Zr_zO_3$, z=0.019

The purpose of presenting this investigation is to demonstrate the preparation and performance of a phosphor prepared from a reagent grade hafnium source without the inclusion of titanium, tin, or rare earth.

The starting material complex hafnyl oxalic acid 3-hydrate was prepared in the manner described in Zhurnal Neoorganicheskoi Khimi, Vol II, 980 (1957) using Reactor Grade Special (R.G.S., z=0.19) hafnium oxychloride 8 hydrate. The oxychlorides were obtained from Teledyne Wah Chang Albany (located at Albany, Oreg.) and used as received.

A sample consisting of 0.0225 mole of hafnyl oxalic acid was ground together with 0.045 mole of $Li_2CO_3$ (Aldrich Chemical Co., 99.997%) in a glass mortar and pestle. The mixture was placed in a 50 mL alumina crucible which was covered with an alumina lid. The crucible was placed in an alumina boat which was then placed in a muffle furance. The sample was heated in air to 1000° C. over 2.5 hours and then held at that temperature for an additional 2.5 hours.

After cooling to room temperature, the fused ingot was removed, broken into small chunks, and ground to a powder in an agate mortar and pestle. The powder was stirred in 250 mL of hot (90°–95° C.) distilled water for 1 hour. The solid was collected by suction filtration and dried in a 500 W CEM Model MDS-81 ™ microwave oven. The dried material was then placed in a 10 mL alumina crucible with an alumina lid, heated in air to 1400° C. over 5 hours, and held at that temperature for 1.5 hours. After cooling to room temperature, the resulting white solid was ground to a powder and examined by X-ray diffraction to confirm the presence of $Li_2Hf_{1-z}Zr_zO_3$ as the primary phase.

The luminescence response of the phosphor powder was in this and all subsequent Examples measured by placing the phosphor powder sample in aluminum planchets (2 mm high × 24 mm diam) at a coverage of about 0.88 g/cm$^2$ and exposing to X-radiation. The X-ray response was obtained using a tungsten target X-ray source in an XRD 6 ™ generator. The X-ray tube was operated at 70 kVp and 10 mA, and the X-radiation from the tube was filtered through 0.5 mm Cu and 1 mm Al filters before reaching the sample. The luminescent response was measured using an IP-28 ™ photomultiplier tube at 500 V bias. The voltage from the photomultiplier was measured with a Keithley ™ high impedance electrometer and is proportional to the total light output of the sample.

To facilitate comparison with the phosphors prepared in subsequent examples, the phosphor of this Example was assigned a relative luminescence of 100. The luminescence response of all subsequent examples are reported relative to this response.

The host emission of the crystalline phosphor was broad and located in the range of from 250–450 nm. The emission spectrum of the sample was obtained during exposure to the unfiltered X-ray source described above. The tube was operated at 70 kVp and 30 mA. The spectrum was acquired with an Instruments S.A. Model HR 320 ™ grating spectrograph equipped with a Princeton Applied Research Model 1422/01 ™ intensified linear diode array detector. The data acquisition and processing was controlled by a Princeton Applied Research Model 1460 OMA III ™ optical multichannel analyzer. The spectrum was corrected for the spectral response of the detector-spectrograph combination. All spectral data presented in this and subsequent examples were acquired in the same manner.

EXAMPLE 2

$Li_2Hf_{1-z}Zr_zO_3$, z=0.019

This example differs from Example 1 in presenting an alternate phosphor preparation which resulted in a higher luminescence response.

The precursor complex trilactohafnic acid was prepared in the following manner: 40 grams of R.G.S. hafnium oxychloride 8-hydrate starting material described above and 44 g of ACS reagent grade lactic acid from Eastman Kodak Company were each dissolved in about 120 mL of distilled water. The hafnium oxychloride solution was added to the lactic acid solution with rapid stirring to form a precipitate, and the resulting mixture was heated to 80° C. with continued stirring for about 0.5 hour. The cooled mixture was filtered and the collected solid was washed with distilled water. After drying for 15 hours at 80° C., the solid weighed 42 g.

(for $C_9H_{16}O_{10}Hf$: theory C=23.4%, H=3.5%; found, C=22.7%, H=3.5%).

A sample consisting of 0.025 mole of trilactohafnic acid was ground together with 0.050 mole of $Li_2CO_3$ from Alfa Inorganics (99%) in a glass mortar and pestle. The mixture was processed in the same manner described in Example 1, except for the wash step. The solid was washed in 100 mL of hot distilled water for 1 hour. X-ray powder diffraction confirmed lithium hafnate as the primary phase, and the emission spectrum exhibited the same general features described for Example 1.

The relative luminescence of the sample was 116, which was significantly better than that of Example 1.

EXAMPLES 3–11

Tin Activator Concentration Series $Li_2Hf_{1-y-z}Zr_zSn_y$

The purpose of presenting these investigations is to demonstrate the preparation and performance of phosphors prepared from a reagent grade hafnium source with the inclusion of varied amounts of tin.

The phosphor preparation procedure of Example 1 was repeated, but with the following differences:

(1) 0.1 to 50 mole percent (y=1×10$^{-3}$ to 0.5) Sn(II)oxalate from Alfa Inorganics was added and ground with the initial mixture and (2) reagent grade $Li_2CO_3$ from Alfa Inorganics (99%) was substituted for the high purity $Li_2CO_3$ employed in Example 1.

The relative luminescence intensity of the phosphor powder samples as a function of their initial tin content is set out in Table X.

TABLE X

| | $Li_2Hf_{1-y-z}Zr_zSn_{y'}$ | |
|---|---|---|
| EXAMPLE NO. | Sn ADDED (y') | RELATIVE INTENSITY |
| 1 | 0.00 | 100 |
| 2 | 0.00 | 116 |
| 3 | 0.0010 | 131 |
| 4 | 0.0050 | 167 |
| 5 | 0.01 | 180 |
| 6 | 0.02 | 193 |
| 7 | 0.03 | 197 |
| 8 | 0.05 | 157 |
| 9 | 0.10 | 167 |
| 10 | 0.20 | 111 |
| 11 (Control) | 0.50 | 57 |

Figure 1:
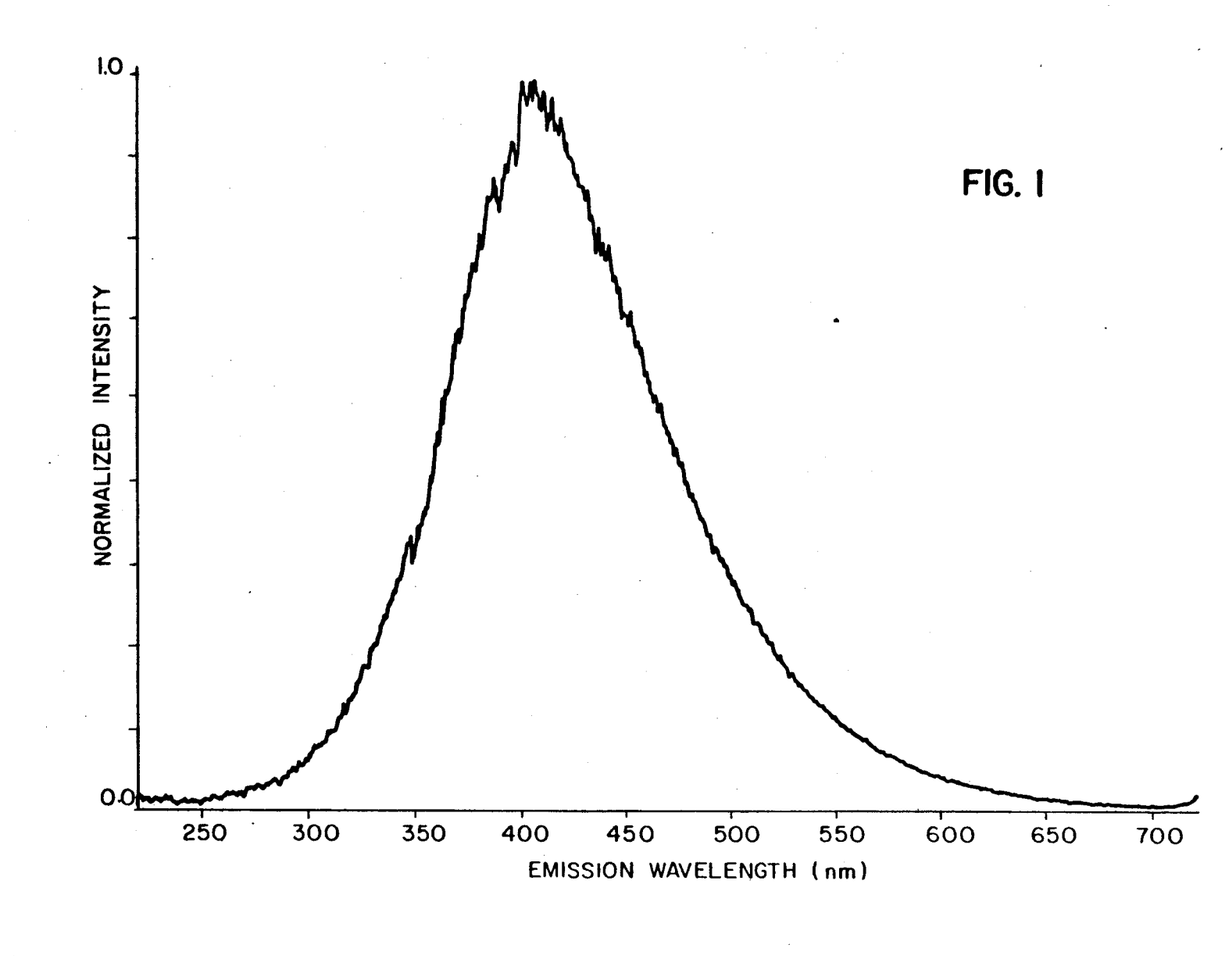
FIGS. 1 to 5 inclusive are emission spectra in which wavelengths of emission in nanometers (nm) are plotted as an abscissa against normalized intensity (peak intensity equals 1) as an ordinant.

The major emission peak of the phosphor was centered in the range of 403–413 nm with a bandwidth at half-maximum of 100–125 nm. FIG. 1 plots normalized emission intensity (peak intensity equals 1.0) versus wavelength for Example 8. The luminescence output appears to be optimized at 1–3 mole percent tin added. X-ray powder diffraction analysis indicated the phosphor samples to be solid solutions of lithium hafnate $Li_2HfO_3$ and $Li_2SnO_3$. Not all of the tin added was retained in the samples. Neutron activation analysis of Examples 5–10 showed retained tin to range from 64 to 73 percent of tin added—i.e. where y'=n(y), n ranged from 1.4 to 1.6.

EXAMPLE 12

Tin Activator, Higher Purity Lithium Source
$Li_2Hf_{1-y-z}Zr_zSn_y$

The purpose of presenting this investigation is to demonstrate that higher luminescence intensities were obtained when an optical grade lithium source was substituted for the reagent grade lithium source of Examples 3–11.

The same procedure of Example 1 was employed using 0.075 mole of hafnyl oxalic acid and adding 1 mole percent (y'=0.01) Sn(II) oxalate from Alfa Inorganics to the initial mixture.

The relative luminescence was 256.

EXAMPLES 13–16

Tin Activator, Reagent Grade Lithium Source, Alternate Preparation $Li_2Hf_{1-y-z}Zr_zSn_y$ The purpose of presenting these investigations is to demonstrate that the luminescence intensities obtained when a tin activator and a reagent grade lithium source was employed in the preparation process of Example 2.

The procedure of Example 2 was employed, except for the addition of of 0.5 to 5 mole percent of Sn(II)oxalate (obtained from Alfa Inorganics) to the initial mixture. Also, reagent grade $Li_2CO_3$ from Alfa Inorganics (99%) was used instead of high purity $Li_2CO_3$ from Aldrich Chemical Co. (99.997%).

The relative luminescence levels are shown in Table XI. The emission spectra were the same as in Examples 3 to 11.

TABLE XI

| | $Li_2Hf_{1-y-z}Zr_zSn_{y'}$ | |
|---|---|---|
| EXAMPLE NO. | Sn ADDED (y') | RELATIVE INTENSITY |
| 1 | 0.00 | 100 |
| 2 | 0.00 | 116 |
| 13 | 0.0050 | 180 |
| 14 | 0.010 | 198 |
| 15 | 0.020 | 202 |
| 16 | 0.050 | 184 |

EXAMPLES 17–23

Varied Zirconium Levels $Li_2Hf_{1-z}Zr_zSn_y$

The purpose of presenting these investigations is to demonstrate the effect of increasing proportions of zirconium.

EXAMPLE 17

The same procedure described in Example 1 was employed using hafnyl oxalic acid (made from optical grade hafnium oxychloride 8-hydrate obtained from Teledyne Wah Chang Albany). One mole percent Sn(II) oxalate was added and ground with the initial mixture of starting materials.

EXAMPLES 18–22

The same procedure described in Example 1 was employed using mixtures of hafnyl oxalic acid (made from R.G.S. hafnium oxychloride 8-hydrate obtained from Teledyne Wah Chang Albany) and zirconyl oxalic acid (made from R.G.S. zirconium oxychloride 8-hydrate obtained from Teledyne Wah Chang Albany) to obtain different values of z. One mole percent Sn(II) oxalate was added and ground with the initial mixture of starting materials.

EXAMPLE 23

The same procedure described in Example 5 using zirconyl oxalic acid (from R.G.S. zirconium oxychloride 8-hydrate). The wash step consisted of stirring the solid in 100 mL of hot distilled water for 1 hour.

Relative luminescence values as a function of zirconium content are summarized in Table XII.

TABLE XII

| | $Li_2Hf_{1-z}Zr_zSn_y$ | |
|---|---|---|
| EXAMPLE NO. | Zr CONTENT (Z) | RELATIVE INTENSITY |
| 17 | 0.00028 | 170 |
| 18 | 0.019 | 172 |
| 19 | 0.05 | 164 |
| 20 | 0.10 | 155 |
| 21 | 0.20 | 135 |
| 22 (Control) | 0.50 | 64 |
| 23 (Control) | 0.99 | 25 |

The examples show a decline in luminescence intensity at zirconium concentrations greater than 20 mole percent (z=0.20). The emission spectra was similar to that of the other tin activated examples. X-ray powder diffraction analysis indicated a solid solution of lithium hafnate ($Li_2HfO_3$) and lithium zirconate ($Li_2ZrO_3$).

EXAMPLE 24

$Li_2Hf_{1-z}Zr_zTi_x$

The purpose of presenting this investigation is to demonstrate the emission spectrum obtained when titanium is employed as an activator.

Figure 2:
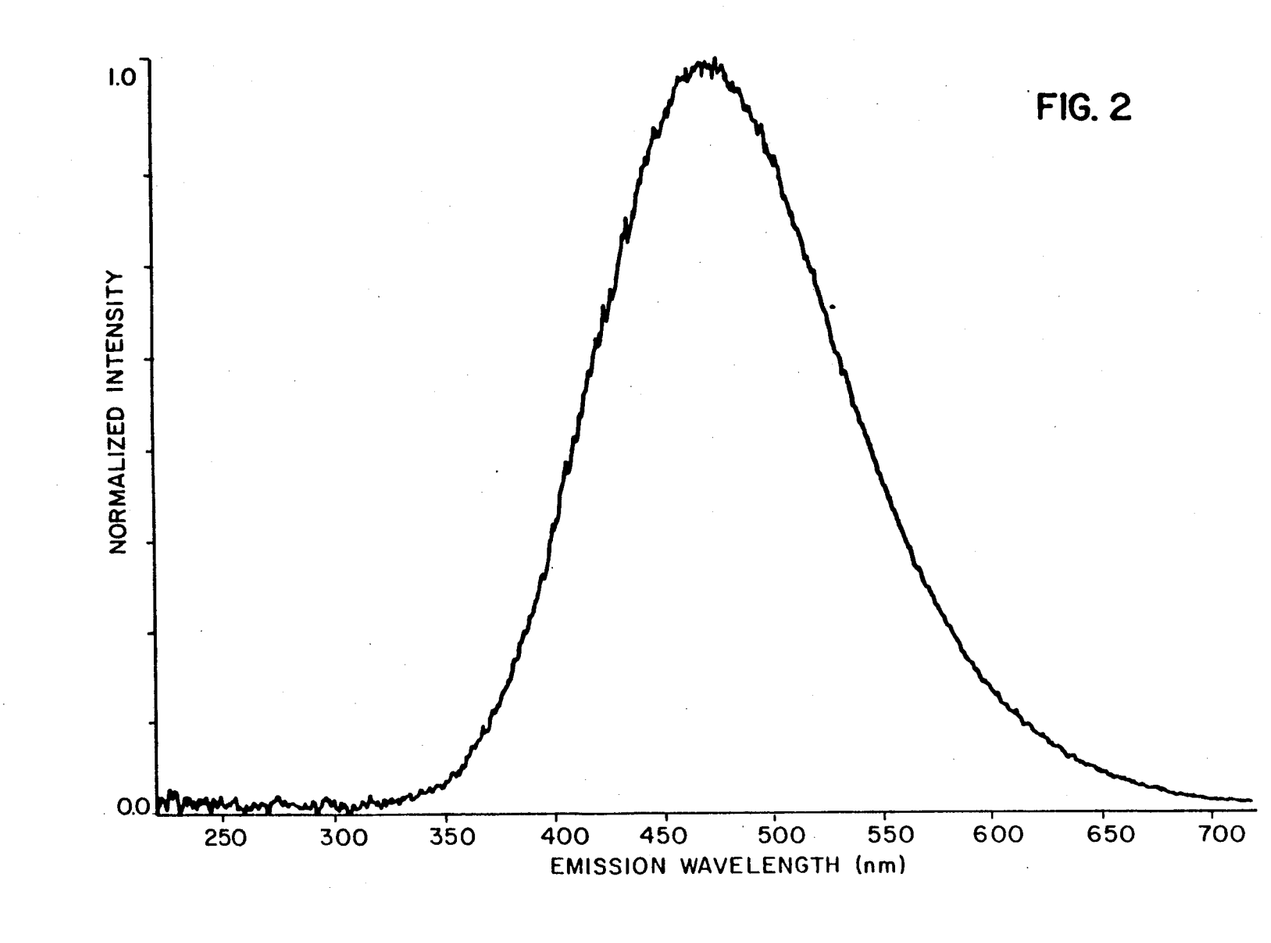

A sample consisting 0.025 mole of trilactohafnic acid prepared as described in Example 2 was thoroughly ground with 0.0005 mole of $TiO_2$ obtained from EM Chemicals (Optipur grade) and 0.050 mole of $Li_2CO_3$ from Alfa Products (Ultrapure grade). The emission spectra is shown in FIG. 2. Peak emission was in the wavelength range of from about 460–480 nm.

X-ray diffraction analysis indicated titanium activated lithium hafnate to be the primary phase of the phosphor. When preparation procedures were varied to form titanium activated hafnia as a second phosphor phase, enhanced levels of luminescence in the relative intensity range of about 135–145 were obtained.

EXAMPLES 25–30

Rare Earth Activated Phosphors

The purpose of presenting these investigations is to demonstrate the efficiency of rare earth activators to shift the emission wavelengths of the phosphors.

EXAMPLE 25

Gadolinium Activation

Figure 3:
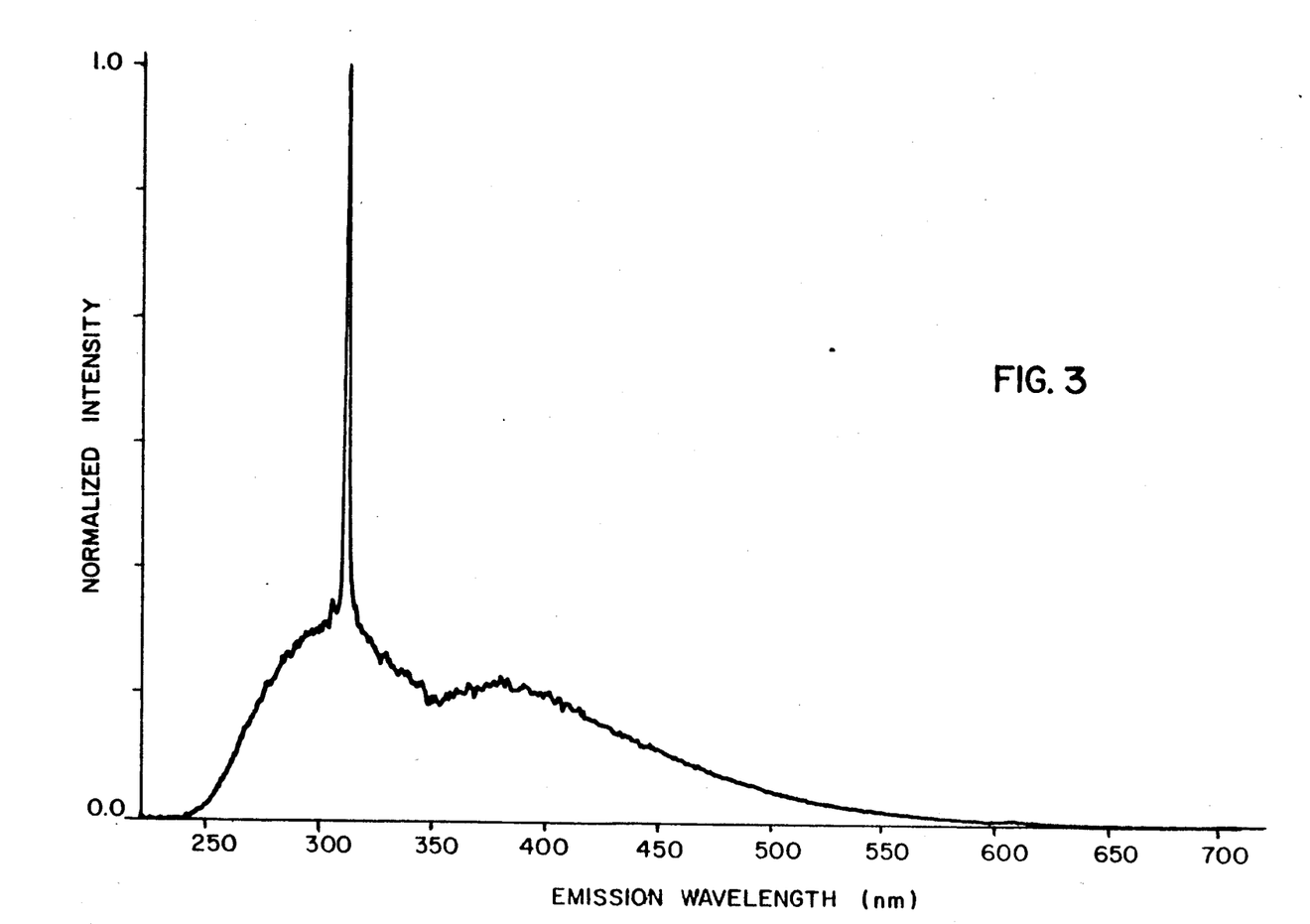

A sample consisting of 0.0275 mole of hafnyl oxalic acid (prepared as described in Example 1), 0.055 mole of $Li_2CO_3$ (Alfa Products, Ultrapure grade) and $1.3675 \times 10^{-5}$ mole of $Gd_2(C_2O_4)_3 10H_2O$ (Alfa Products, 99.9%) were ground together with a glass mortar and pestle. The stoichiometry corresponded to 0.1 mole percent $Gd^{+3}$. The mixture was then processed as described in Example 1. The relative luminescence output was 62. A marked alteration of the emission spectra was created by the gadolinium activator, as indicated by FIG. 3.

EXAMPLE 26

Gadolinium Activation

Example 25 was repeated, except for the use of $2.75 \times 10^{-4}$ mole of $Gd_2(C_2O_4)_3 10H_2O$. The stoichiometry corresponded to 2 mole percent $Gd^{+3}$. The relative luminescence output was 85.

EXAMPLE 27

Europium Activation

Figure 4:
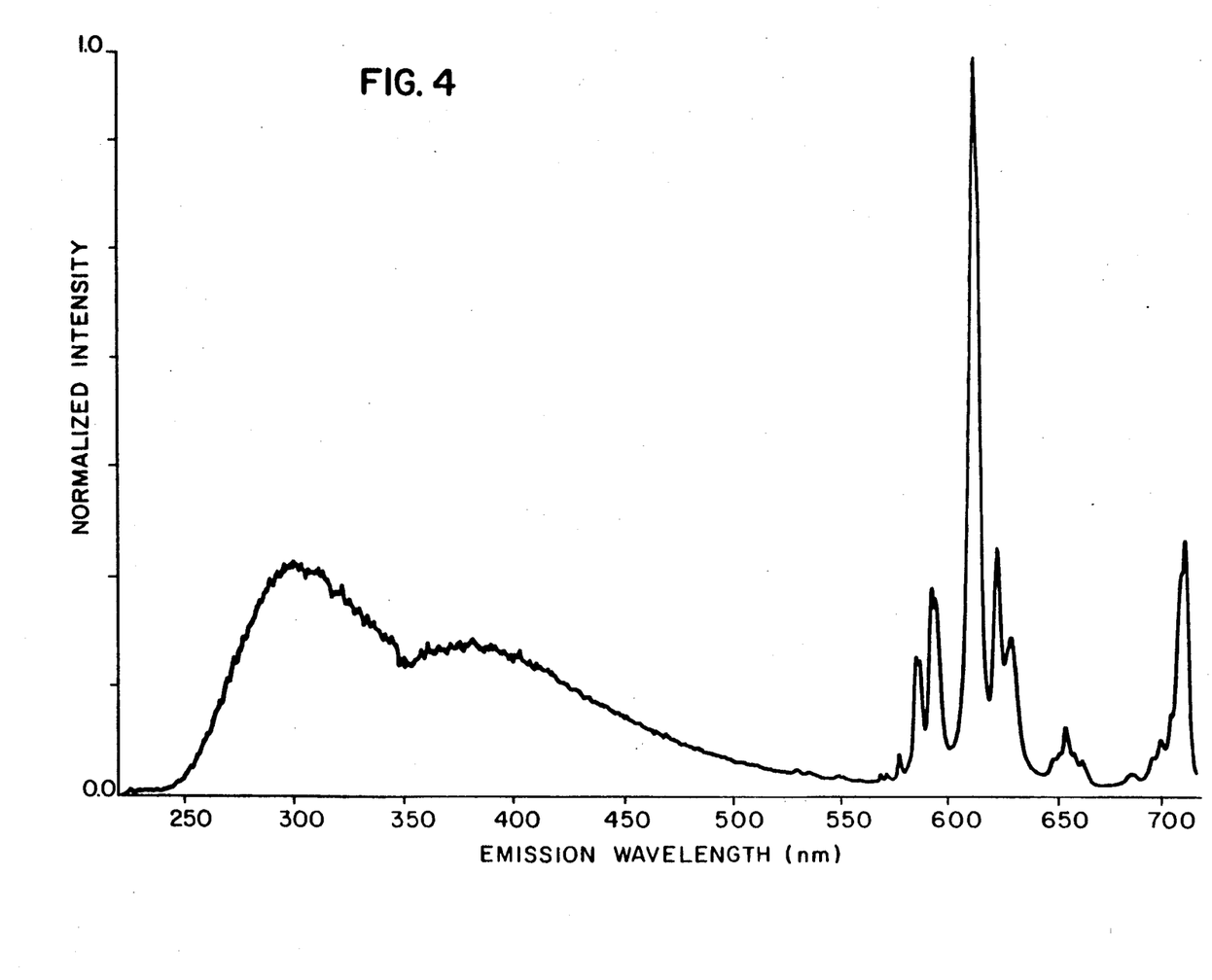

Example 25 was repeated, except that $2.75 \times 10^{-5}$ mol of $Eu(NO_3)_3 6H_2O$ (Johnson Matthey REacton grade, 99.99%) were used instead of the gadolinium oxalate. The stoichiometry corresponded to 0.1 mole percent $Eu^{+3}$. The emission spectra is shown in FIG. 4. The relative luminescence was 82.

EXAMPLE 28

Europium Activation

Example 27 was repeated, except that the europium was increased to 2 mole percent. The relative luminescence was 93.

EXAMPLE 29

Samarium Activation

Figure 5:
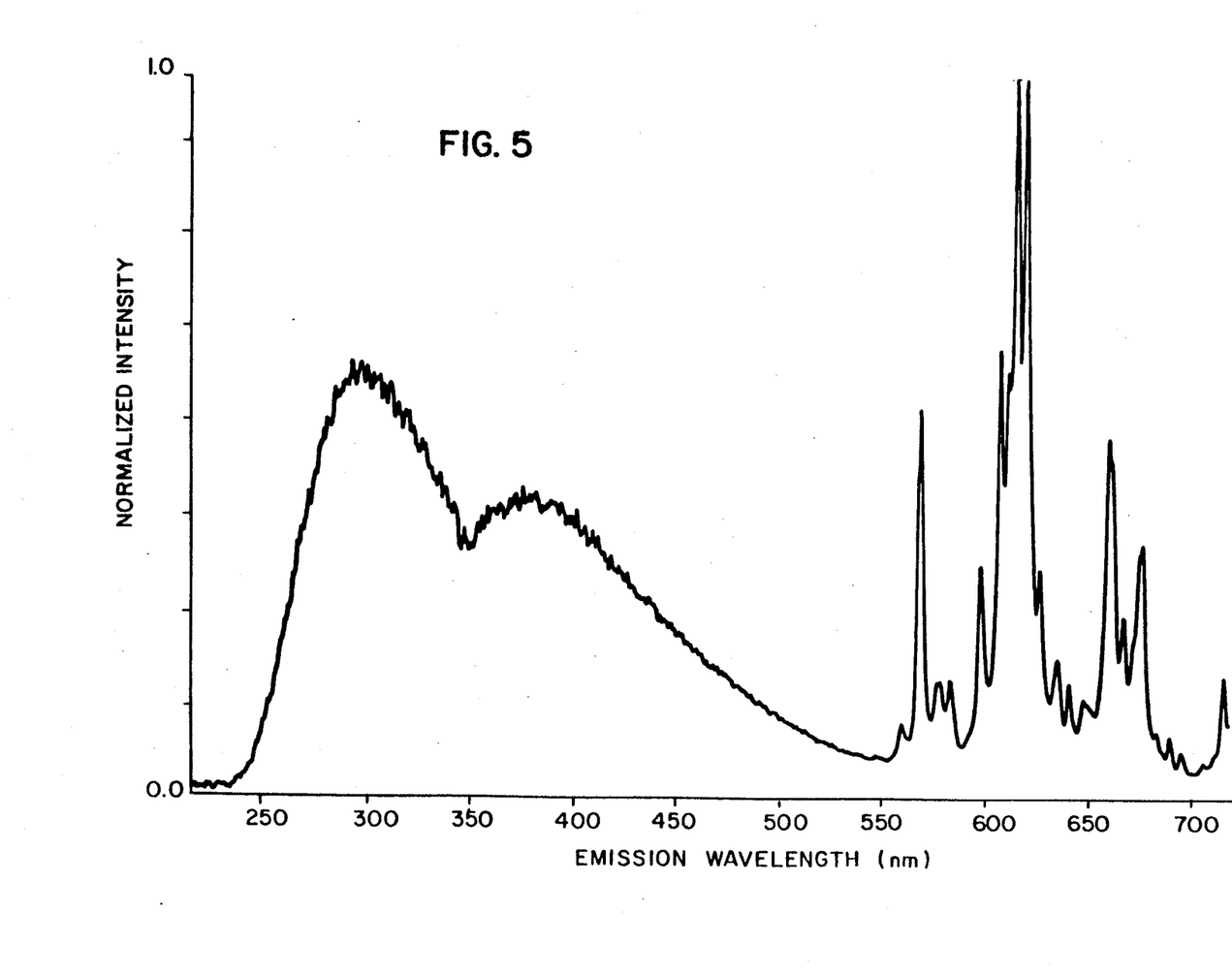

Example 25 repeated, except that $2.75 \times 10^{-5}$ mole of $Sm(NO_3)_3 6H_2O$ (Alfa Products 99.9%) was used instead of the gadolinium oxalate. The stoichiometry corresponded to 0.1 mole percent $Sm^{+3}$. The emission spectra is shown in FIG. 5. The relative luminescence was 82.

EXAMPLE 30

Samarium Activation

Example 29 was repeated, except that the samarium was increased to 2 mole percent. The relative luminescence was 57.

EXAMPLE 31

Intensifying Screen

The purpose of including this investigation was to demonstrate the performance of an intensifying screen containing a crystalline phosphor of the type contemplated by this invention.

Approximately 164 g of phosphor was prepared as described in Example 5. The ground phosphor was passed through a sieve with 45 μm openings to give about 104 grams of sieved phosphor. The sieved phosphor was dispersed in a 13% solution of Permuthane U-6366 TM polyurethane binder using a methylene chloride and methanol solvent mixture at a phosphor to binder ratio of 16:1, hand coated onto a blue dyed poly(ethylene terephthalate) film support, and overcoated with cellulose acetate. The phosphor coverage of the screen was about 460 g/m². The relative luminescence intensity was 82.

From these and other investigations it was concluded that the phosphors described above were well suited for incorporation in the fluorescent layer of an intensifying screen.

EXAMPLES 32-47

Tin Activator Concentration Series $Li_2Hf_{1-y-z}Zr_zSn_y$

The purpose of presenting these investigations is to describe the performance of phosphors prepared from a reagent grade hafnium source with the inclusion of a known amount of tin.

A hydrous hafnia precursor was prepared in the following manner: 2.5 mole of R.G.S. hafnium oxychloride 8-hydrate (0.25 mole percent Zr) from Teledyne Wah Chang Albany was dissolved in 2.5L of distilled water, and 5.0 mole of sodium hydroxide pellets (Eastman Kodak Company) was dissolved in 2.5L of distilled water. The solutions were added simultaneously to a large precipitation vessel with rapid stirring. The resulting gel was collected by vacuum filtration and then dried to 40% solids in a convection oven at 50° C. The dried material was then heated in a muffle furnace for one hour at 325° C. The solid was washed three times with 10L of distilled water. The collected material was dried for 16 hours at 50° C. in a convection oven.

Samples were prepared with Sn contents ranging from y=0.0 ($Li_2HfO_3$) to y=0.50 ($Li_2Hf_{0.5}Sn_{0.5}O_3$). A mixture of (0.02 mole) of hydrous hafnia and Sn(II) oxalate (Aesar) was ground with a 10 mole percent excess of $Li_2CO_3$ (Aldrich Chemical Co. 99.997%) in an agate mortar and pestle. The mixture was placed in a 20 mL alumina crucible and covered with an alumina lid. The sample was heated in air at 700° C. for six hours. After cooling to room temperature, the charge was ground and refired twice, with an intermediate grinding, at 1300° C. for six hours.

The $Li_2HfO_3$ crystal structure was maintained through y=0.45. X-ray diffraction shows that a small amount of $Li_2SnO_3$ phase is present in the y=0.50 sample. The relative luminescence intensity of the phosphor powder samples as a function of tin content is set out in Table XIII.

TABLE XIII

| | $Li_2Hf_{1-y-z}Zr_zSn_y$ | |
|---|---|---|
| Example No. | Sn Content (y) | Relative Intensity |
| 32 | 0.000 | 72 |
| 33 | 0.001 | 133 |
| 34 | 0.005 | 167 |
| 35 | 0.010 | 164 |
| 36 | 0.015 | 154 |
| 37 | 0.020 | 193 |
| 38 | 0.025 | 198 |
| 39 | 0.030 | 184 |
| 40 | 0.040 | 179 |
| 41 | 0.050 | 205 |
| 42 | 0.100 | 152 |
| 43 | 0.250 | 75 |
| 44 | 0.300 | 75 |
| 45 | 0.400 | 51 |
| 46 | 0.450 | 22 |
| 47 | 0.500 | 16 |

The emission spectra was relatively unchanged in shape and peak maximum through the series. The luminescence output was increased at concentrations of y=0.001 up to concentrations between 0.100 and 0.250 (the performance improvement being shown in Table X to extend to y'=0.20). Within the overall range, the range of from y=0.005 to 0.100 is shown to be preferred, with the optimum luminescence output being from y=0.02 to 0.05.

EXAMPLE 48

Titanium activator, single phase $Li_2Hf_{1-z-x}Zr_zTi_x$

The purpose of presenting this investigation is to demonstrate the emission spectrum obtained when titanium is employed as an activator in a $Li_2HfO_3$ sample which does not contain $HfO_2$ as an impurity phase.

Hydrous hafnia precursor (prepared as described in Examples 32-47) in the amount of 0.02 mole was ground with a 0.022 mole of $Li_2CO_3$ (Aldrich Chemical Company, 99.997%) and 0.0004 mole of $TiO_2$ (EM Chemicals, Optipur grade 99.9%) in a glass mortar and pestle. The mixture was then placed in a 20 mL alumina crucible with an alumina lid and heated in a muffle furnace at 700° C. for six hours. The charge was reground with an agate mortar and pestle and heated in air at 1200° C. for six hours. The relative luminescence intensity of the sample was 28.

The emission peak maximum was located at 425 nm with a half height width of 110 nm. X-ray diffraction analysis of the sample showed no evidence of $HfO_2$.

EXAMPLES 49–50

$Li_2Hf_{1-z}Zr_z$ and $Na_2Hf_{1-z}Zr_z$

The purpose of presenting these investigations is to provide a comparison of the relative luminescence output of host $Li_2HfO_3$ (Example 49) and another alkali metal hafnate $Na_2HfO_3$ (Example 50). The $Li_2HfO_3$ example demonstrates an improved preparation over those described in Examples 1–31.

Hydrous hafnia precursor (see Examples 32–47) in the amount of 0.02 mole was ground with a 5 mole percent excess of either $Li_2CO_3$ (Aldrich Chemical Company, 99.997%) or $Na_2CO_3$ (Aldrich Chemical Company, 99.99%) in a glass mortar and pestle. The samples were placed in 20 mL alumina crucibles with alumina lids and heated together in air in a muffle furnace at 700° C. for six hours. The charges were ground in an agate mortar and pestle, and refired in alumina crucibles at 1300° C. for six hours. X-ray diffraction analysis showed that the $Li_2HfO_3$ sample exhibited a single crystalline phase while $Na_2HfO_3$ was the major phase in the comparison sample.

The relative luminescence intensity of the $Li_2HfO_3$ sample was 176, and that of the $Na_2HfO_3$ sample was 57. The $Li_2HfO_3$ sample showed an unexpected 3X enhancement in luminescence output.

EXAMPLES 51–52

$Li_2Hf_{1-y-z}Zr_zSn_y$ and $Na_2Hf_{1-y-z}Zr_zSn_y$

The purpose of presenting these investigations is to provide a comparison of the relative luminescence output of tin-activated $Li_2HfO_3$ (Example 51) and tin-activated $Na_2HfO_3$ (Example 52).

Hydrous hafnia precursor (prepared as described in Examples 32–47) in the amount of 0.02 mole was ground with 0.0002 mole of Sn(II)oxalate from Aesar and a 5% excess of either $Li_2CO_3$ (Aldrich Chemical Company, 99.997%) or $Na_2CO_3$ (EM chemical Company Suprapure grade). The mixtures were placed in 20 mL alumina crucibles and covered with alumina lids. The charges were heated together in air at 700° C. for six hours, 1000° C. for six hours, and 1200° C. for three hours, with intermediate grindings. X-ray diffraction analysis showed the $Li_2HfO_3$ sample to be single phase and $Na_2HfO_3$ to be the major phase in the comparison sample.

The tin-activated $Li_2HfO_3$ sample gave a relative luminescence output of 220, while the tin-activated $Na_2HfO_3$ sample gave a relative response of only 67.

The invention has been described in detail with particular reference to preferred embodiments thereof, but it will be understood that variations and modifications can be effected within the spirit and scope of the invention.

What is claimed is:

1. An X-ray intensifying screen comprised of
   a support and
   a fluorescent layer containing an organic binder that is transparent to X-radiation and to radiation emitted when the layer is excited by X-radiation and phosphor crystals capable of absorbing X-radiation and emitting longer wavelength electromagnetic radiation,
   characterized in that the phosphor crystals consist essentially of oxygen and a combination of metals satisfying the relationship:

$Li_2Hf_{1-x-y-z}Zr_zSn_yTi_xL_w$ where
   L is at least one rare earth selected from the group consisting of praseodymium, samarium, europium, gadolinium, terbium, dysprosium, and ytterbium;
   y is in the range of from from $1 \times 10^{-3}$ to 0.2:
   w+x+y are together up to 0.2; and
   z is up to 0.2;
   said phosphor crystals exhibiting a higher luminescence intensity when excited by X-radiation as compared to the phosphor crystals as described above absent tin.

2. An X-ray intensifying screen according to claim 1 further characterized in that z is in the range of from $2.75 \times 10^{-4}$ to 0.15.

3. An X-ray intensifying screen according to claim 2 further characterized in that z is up to $2.5 \times 10^{-2}$.

4. An X-ray intensifying screen according to claim 1 further characterized in that y is in the range of from $5 \times 10^{-3}$ to 0.1.

5. An X-ray intensifying screen according to claim 1 further characterized in that x is at least $3 \times 10^{-4}$.

6. An X-ray intensifying screen according to claim 5 further characterized in that x is in the range of from $1 \times 10^{-3}$ to $5 \times 10^{-2}$.

7. An X-ray intensifying screen according to claim 6 further characterized in that w is zero.

8. An X-ray intensifying screen according to claim 1 further characterized in that w is in the range of from $1 \times 10^{-4}$ to 0.1.

9. An X-ray intensifying screen according to claim 8 further characterized in that w is in the range of from $1 \times 10^{-3}$ to $5 \times 10^{-2}$.

10. An X-ray intensifying screen according to claim 9 further characterized in that x is zero.

11. An X-ray intensifying screen according to claim 9 further characterized in the rare earth is selected from the class consisting of gadolinium, europium, and samarium.

12. An X-ray intensifying screen comprised of
    a support and
    a fluorescent layer containing an organic binder that is transparent to X-radiation and to radiation emitted when the layer is excited by X-radiation and phosphor crystals capable of absorbing X-radiation and emitting longer wavelength electromagnetic radiation,
    characterized in that the phosphor crystals consist essentially of oxygen and a combination of metals satisfying the relationship:

$Li_2Hf_{1-y-z}Zr_zSn_y$ where
    y is in the range of from $1 \times 10^{-3}$ to 0.2 and
    z is up to 0.2;
    said phosphor crystals exhibiting a higher luminescence intensity when excited by X-radiation as compared to the phosphor crystals as described above absent tin.

13. An X-ray intensifying screen according to claim 12 further characterized in that z is in the range of from $2.75 \times 10^{-4}$ to 0.15.

14. An X-ray intensifying screen according to claim 13 further characterized in that
y is in the range of from $5 \times 10^{-3}$ to 0.1 and
z is up to $2.5 \times 10^{-2}$.

15. A composition capable of absorbing X-radiation and emitting longer wavelength radiation comprised of phosphor crystals consisting essentially of oxygen and a combination of metals satisfying the relationship:

$$Li_2Hf_{1-x-y-z}Zr_zSn_yTi_xL_w$$

where
L is at least one rare earth selected from the group consisting of praseodymium, samarium, europium, gadolinium, terbium, dysprosium, and ytterbium;
y is in the range of from from $1 \times 10^{-3}$ to 0.2;
w+x+y are together up to 0.2; and
z is up to 0.2;
said phosphor crystals exhibiting a higher luminescence intensity when excited by X-radiation as compared to the phosphor crystals as described above absent tin.

16. A composition according to claim 15 further characterized in that z is in the range of from $2.75 \times 10^{-4}$ to 0.15.

17. A composition according to claim 16 further characterized in that z is up to $2.5 \times 10^{-2}$.

18. A composition according to claim 15 further characterized in that y is in the range of from $5 \times 10^{-3}$ to 0.1.

19. A composition according to claim 15 further characterized in that x is at least $3 \times 10^{-4}$.

20. A composition according to claim 19 further characterized in that x is in the range of from $1 \times 10^{-3}$ to $5 \times 10^{-2}$.

21. A composition according to claim 20 further characterized in that w is zero.

22. A composition according to claim 15 further characterized in that w is in the range of from $1 \times 10^{-4}$ to 0.1.

23. A composition according to claim 22 further characterized in that w is in the range of from $1 \times 10^{-3}$ to $5 \times 10^{-2}$.

24. A composition according to claim 23 further characterized in that x is zero.

25. A composition according to claim 22 further characterized in the rare earth is selected from the class consisting of gadolinium, europium, and samarium.

26. A composition capable of absorbing X-radiation and emitting longer wavelength radiation comprised of phosphor crystals consisting essentially of oxygen and a combination of metals satisfying the relationship:

$$Li_2Hf_{1-y-z}Zr_zSn_y$$

where
y is $1 \times 10^{-3}$ to 0.2 and
z is up to 0.2;
said phosphor crystals exhibiting a higher luminescence intensity when excited by X-radiation as compared to the phosphor crystals as described above absent tin.

27. A composition according to claim 26 further characterized in that
y is in the range of from $5 \times 10^{-3}$ to 0.1 and
z is up to $2.5 \times 10^{-2}$.

* * * * *